(No Model.)
F. B. AGLAR.
BRAKE BEAM.
No. 557,934.          Patented Apr. 7, 1896.
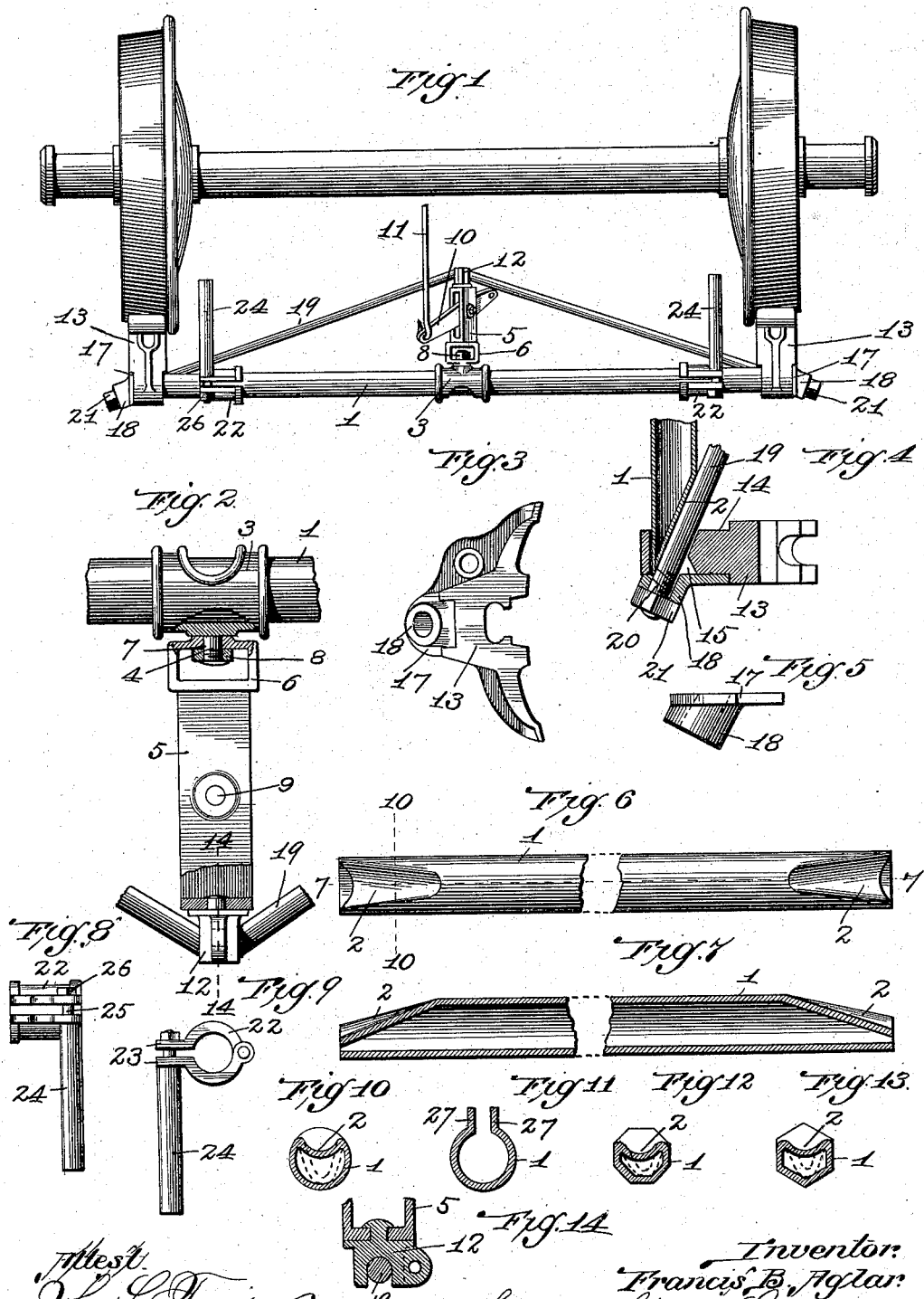

UNITED STATES PATENT OFFICE.

FRANCIS B. AGLAR, OF ST. LOUIS, MISSOURI, ASSIGNOR TO THE INTERCHANGEABLE BRAKE BEAM COMPANY, OF SAME PLACE.

BRAKE-BEAM.

SPECIFICATION forming part of Letters Patent No. 557,934, dated April 7, 1896.

Application filed December 27, 1895. Serial No. 573,477. (No model.)

*To all whom it may concern:*

Be it known that I, FRANCIS B. AGLAR, of the city of St. Louis, State of Missouri, have invented certain new and useful Improvements in Brake-Beams, of which the following is a full, clear, and exact description, reference being had to the accompanying drawings, forming a part hereof.

My invention relates to an improved brake-beam; and it consists in the novel construction, combination, and arrangement of parts hereinafter described and claimed.

In the drawings, Figure 1 is a plan view of my improved brake-beam, the same being shown in proper position relative to the car-axle and the wheels thereof. Fig. 2 is an enlarged plan view of the swiveled fulcrum of which I make use in my improved brake-beam, parts thereof being broken away to more clearly illustrate the same. Fig. 3 is a side elevation of the brake-shoe made use of in my improved brake-beam. Fig. 4 is a detail horizontal sectional view showing the construction employed for rigidly locating the brake-shoes upon the ends of the compression member of the beam. Fig. 5 is a top plan view of the drop-plate made use of. Fig. 6 is a top plan view of the hollow back strut or compression member of my improved brake-beam. Fig. 7 is a longitudinal sectional view taken approximately on the indicated line 7 7 of Fig. 6. Fig. 8 is a top plan view of the finger-guards of my improved brake and the collar used for securing the same to the compression member. Fig. 9 is a side elevation of this finger-guard and collar. Fig. 10 is a cross-sectional view taken approximately on the indicated line 10 10 of Fig. 6. Figs. 11, 12, and 13 are cross-sectional views of modified forms of hollow compression members that may be made use of in a brake-beam of my improved construction. Fig. 14 is an enlarged sectional view, the same being taken on the line 14 14 of Fig. 2.

Referring by numerals to the accompanying drawings, 1 indicates the compression member of my improved beam, the same being constructed of a tube of suitable length and diameter, and in the ends of this tube, in alinement on one side thereof, are formed U-shaped depressions 2, the same extending from the ends of said tubes inwardly toward one another and toward the longitudinal center of said beam, and said depressions gradually taper and decrease in depth until they reach the original surface or periphery of the tube. Where the hollow tubes are constructed of sheet metal, these depressions 2 may be formed by bending the metal at the ends into the proper form.

Located upon the center of the compression member 1 is a sleeve 3, with which is formed integral a laterally-projecting stud 4.

5 indicates the swiveled fulcrum of which I make use, the same comprising a hollow block, with one end of which is formed integral a rectangular yoke 6, the outer wall of which is provided with an aperture 7, through which the stud 4 passes. Upon the end of the stud 4, which projects through the aperture 7 and within the yoke 6, is a nut 8, which affords means for fastening said yoke to said stud.

Formed in the side bars of the block comprising the strut are alined apertures 9, through which passes a bolt or pin upon which is fulcrumed a bar 10, to which the brake-beam 11 is attached. To the opposite end of the hollow block comprising the fulcrum from which the yoke 6 is located is swiveled a block 12, the same being U-shaped in cross-section. (See Fig. 14.)

13 13 indicate the brake-shoes, such as I make use of, the same being of ordinary form and provided on their opposite sides with recesses 14. Apertures 15 pass through the rear ends of these shoes, said apertures being for the reception of the ends of the compression member and the ends of the truss-rod.

17 17 indicate what I term "drop-plates," the same being of such a size and form as that they will readily fit within the recesses 14, and said plates are of such thickness as that when fitted into said recesses they will lie flush with the side faces of the brake-shoes 13. Formed integral with the outside faces of these plates 17 are lugs or bosses 18, the same being formed at such angles as that when a pair of said plates are located in the recesses 14 on the outside faces of a pair of the brake-shoes located on the ends of the compression member 1 their perforations will be in direct alinement with the apertures 15 through the brake-shoes and with the U-shaped seat formed in the block 12 previously mentioned.

19 indicates a truss-rod of suitable size, said truss-rod being bent into the form of an inverted and flattened V, and the ends of said truss-rod are screw-threaded, as indicated by 20, in order that they will receive ordinary nuts, such as 21.

When assembling the various parts of my improved brake-beam and locking the same together, the truss-rod 19 is so positioned as that its center rests in the seat formed in the U-shaped block 12 and its ends passing through and seated in the depressions 2, formed in the ends of the compression member 1. When so positioned, the screw-threaded ends of the truss-rod will extend beyond the ends of said compression member. The brake-shoes 13 are now placed in such a position as that the ends of the compression member 1 will be located in the apertures 15 on the inner faces of said brake-shoes, and when so positioned the ends of the truss-rod will pass through the apertures 15 in said brake-shoes. The drop-plates 17 are now located in the recesses 14 on the outer faces of the brake-shoes, and when said drop-plates are thus positioned the ends of the compression member abut against the inner faces of said plates and the screw-threaded ends of the truss-rod pass through and project from the apertures through the lugs 18. The nuts 21 are now located upon said screw-threaded projecting ends, and as said nuts are tightened the brake-shoes will be very firmly locked in position on the ends of said compression member and the proper tension may be obtained between said compression member and the truss-rod 19.

Collars 22, comprising semicircular mating parts hinged together and provided with perforated lugs 23 on their edges opposite the edges that are hinged together, are located upon the compression member 1 adjacent each end thereof. Finger-guards 24 have their rear ends 25 reduced in diameter, said reduced portions being passed through the perforated lugs 23, and upon the projecting ends of said reduced portions are located nuts 26, this construction serving to locate said finger-guards upon the collars, as well as to lock said collars in position upon the compression member. These finger-guards 24 prevent the flanges of the car-wheels from engaging against and wearing upon the truss-rod while said wheels are rounding a curve.

In the modification shown in Fig. 11 the compression member 1 is in the form of a split tube, the same being provided with laterally-extending flanges 27 at its end, this construction obviating the forming of the depressions 2, as the ends of the truss-rod 19 pass between said flanges 27 and through the ends of the split compression members.

In the modification shown in Figs. 12 and 13 the compression members are constructed of hollow beams of octagonal and hexagonal form in cross-section, respectively.

The special advantage gained by constructing a brake-beam in accordance with the foregoing description is that all of the parts are interchangeable. Either of the brake-shoes may be used upon either end of the compression member, the drop-plates may be located in either recess of either brake-shoe, the finger-guards may be located on either end of the compression member, and said compression member or the truss-rod may be turned end for end, and yet the entire brake will remain identical in form and construction.

By providing the swiveled fulcrum any lateral movement of the brake-rod is compensated for and the same may be operated on either the right or left hand side of said swiveled fulcrum with equal advantage. This feature of constructing the various parts so as to be interchangeable is decidedly advantageous, as when putting the brake together much time, labor, and expense are saved, and should any one part become lost or broken or worn so as to be unfit for use it can be renewed or replaced cheaply and expeditiously, as said various parts are provided in large numbers and it is not necessary to specify a "right" or "left" or some special pattern.

A brake-beam so constructed is inexpensive, combines great strength with minimum weight, can be expeditiously assembled or dissembled, and possesses superior advantages in point of simplicity, durability, and general efficiency.

I claim—

1. A brake-beam constructed with a compression member having alined depressions formed in its ends, brake-shoes having recesses formed in its sides located upon the end of said compression member, a swiveled fulcrum extending rearwardly from the center of said compression member, a truss-rod the center of which is located on the end of said swiveled fulcrum and the ends thereof passing through suitably-formed apertures in the brake-shoes, interchangeable drop-plates located in the recesses formed in the outside faces of the brake-shoes and upon the protruding ends of the truss-rod, and nuts located upon the ends of said truss-rod to rigidly lock the various parts in position.

2. A brake-beam constructed with a tubular compression member having alined depressions formed in its ends, a collar located upon the center of said compression member, a stud formed integral with said collar and projecting laterally therefrom, a rectangular yoke swiveled upon said stud, a hollow block carried by said rectangular yoke in which the brake-lever is fulcrumed, a U-shaped block swiveled to the forward end of the hollow block, a truss-rod having its center seated in said U-shaped block, the screw-threaded ends of said truss-rod lying within the previously-mentioned depressions in the ends of the compression member, interchangeable brake-shoes provided with recesses on their sides located upon the ends of the compression member, said brake-shoes being provided with apertures in which the ends of the compression member are located and through which the ends of the truss-rod pass, interchangeable drop-plates located in the recesses formed in the outer faces of the shoes through which plates the ends of the truss-rod pass, nuts located upon the protruding ends of said truss-rod for rigidly locking the parts in position, and interchangeable finger-guards removably located upon the compression member adjacent the brake-shoes.

3. The combination, in a brake-beam, of a compression member having alined depressions formed in its ends, interchangeable brake-shoes located upon the ends of said compression member in the sides of which brake-shoes are formed recesses and apertures, the latter being for the reception of the depressed ends of the compression member and the truss-rod, interchangeable drop-plates, and nuts for locking the brake-shoes to the compression member.

4. The combination, in a brake-beam, of a compression member having alined depressions formed in its ends, brake-shoes located upon said ends, in the faces of which brake-shoes are formed recesses and apertures, a truss-rod having its ends lying in the depressions formed in the ends of the compression member and passing through the apertures formed in the brake-shoes, and interchangeable drop-plates constructed to pass over the ends of said truss-rod and lie within the recesses in the outer faces of the brake-shoes when the same are in position and to be locked in such position by the nuts on the ends of said truss-rod.

In testimony whereof I affix my signature in presence of two witnesses.

FRANCIS B. AGLAR.

Witnesses:
JOHN C. HIGDON,
MAUD GRIFFIN.